(12) United States Patent
Kim et al.

(10) Patent No.: US 11,213,914 B2
(45) Date of Patent: Jan. 4, 2022

(54) LASER PROCESSING METHOD AND METHOD OF MANUFACTURING DISPLAY APPARATUS

(71) Applicant: Samsung Display Co., Ltd., Yongin-si (KR)

(72) Inventors: Jaesik Kim, Yongin-si (KR); Taemin Kang, Yongin-si (KR); Jeongkuk Kim, Yongin-si (KR); Youngsuk Cho, Yongin-si (KR)

(73) Assignee: Samsung Display Co., Ltd.

( * ) Notice: Subject to any disclaimer, the term of this patent is extended or adjusted under 35 U.S.C. 154(b) by 596 days.

(21) Appl. No.: 15/422,847

(22) Filed: Feb. 2, 2017

(65) Prior Publication Data
US 2017/0216968 A1 Aug. 3, 2017

(30) Foreign Application Priority Data

Feb. 2, 2016 (KR) .................. 10-2016-0012904

(51) Int. Cl.
*B23K 26/067* (2006.01)
*B23K 26/064* (2014.01)

(52) U.S. Cl.
CPC ........ *B23K 26/0676* (2013.01); *B23K 26/064* (2015.10)

(58) Field of Classification Search
CPC .............. B23K 26/0676; B23K 26/064; B23K 26/067; B23K 26/066; B23K 26/0869; B23K 26/402; B23K 26/382; B23K 2103/50; B23K 2103/42; C23C 14/042; B05C 21/005; G02B 27/00
(Continued)

(56) References Cited

U.S. PATENT DOCUMENTS

| | | | | |
|---|---|---|---|---|
| 4,496,209 A | * | 1/1985 | Itoh | ..................... G02B 27/0031 359/206.1 |
| 5,029,956 A | * | 7/1991 | Takanashi | ............ H04N 1/1135 359/205.1 |

(Continued)

FOREIGN PATENT DOCUMENTS

| | | |
|---|---|---|
| JP | 2015-145525 A | 8/2015 |
| KR | 10-2008-0000449 A | 1/2008 |

(Continued)

OTHER PUBLICATIONS

Webster definition to "enter" (Year: 2020).*

*Primary Examiner* — Phuong T Nguyen
*Assistant Examiner* — Bonita Khlok
(74) *Attorney, Agent, or Firm* — Innovation Counsel LLP

(57) ABSTRACT

Provided are a laser processing method capable of performing various types of processing while reducing a need to change components and method of manufacturing a display apparatus by using the laser processing method. The laser processing method includes: splitting a laser beam emitted from a laser beam source into a plurality of laser beams by using a laser beam splitter; and transmitting at least two of the plurality of laser beams through a position adjustment equipment that is on paths of the at least two laser beams in order to adjust a distance between the at least two laser beams by using a difference between a refractive index of an element of the position adjustment equipment and a refractive index of a peripheral environment.

12 Claims, 7 Drawing Sheets

(58) Field of Classification Search
USPC .......................... 219/121.77, 121.73, 121.75,
219/121.78–121.79; 359/618–640, 811,
359/818, 822, 823
See application file for complete search history.

(56) References Cited

U.S. PATENT DOCUMENTS

| | | | | |
|---|---|---|---|---|
| 6,002,524 | A * | 12/1999 | Schubert | G02B 26/125 |
| | | | | 359/642 |
| 6,166,759 | A * | 12/2000 | Blanding | B41J 2/451 |
| | | | | 347/242 |
| 8,450,638 | B2 * | 5/2013 | Kajikawa | B23K 26/0608 |
| | | | | 219/121.6 |
| 8,963,979 | B2 * | 2/2015 | Tajima | G02B 26/0825 |
| | | | | 347/242 |
| 9,643,280 | B2 * | 5/2017 | Lee | B23K 26/0604 |
| 2014/0076869 | A1 * | 3/2014 | Lee | B23K 26/0624 |
| | | | | 219/121.75 |
| 2015/0114293 | A1 * | 4/2015 | Chung | C23C 14/042 |
| | | | | 118/721 |
| 2015/0283651 | A1 | 10/2015 | Kudo et al. | |

FOREIGN PATENT DOCUMENTS

| | | |
|---|---|---|
| KR | 10-2008-0054510 A | 6/2008 |
| KR | 10-2013-0025237 A | 3/2013 |
| KR | 10-2015-0032087 A | 3/2015 |
| KR | 10-2015-0099832 A | 9/2015 |

* cited by examiner

LASER PROCESSING METHOD AND METHOD OF MANUFACTURING DISPLAY APPARATUS

CROSS-REFERENCE TO RELATED APPLICATION

This application claims the benefit of Korean Patent Application No. 10-2016-0012904, filed on Feb. 2, 2016, in the Korean Intellectual Property Office, the disclosure of which is incorporated herein in its entirety by reference.

BACKGROUND

1. Field

One or more embodiments relate to a laser processing method and method of manufacturing a display apparatus, and more particularly, to a laser processing method capable of performing various types of processing while reducing a need to change components and method of manufacturing a display apparatus by using the laser processing method.

2. Description of the Related Art

In general, masks having various shaped openings are used to form various patterns in manufacturing electronic devices. For example, in order to manufacture an organic light-emitting display apparatus, an organic material needs to be deposited on a predetermined area. To do this, deposition is performed by using a mask having openings corresponding to the predetermined area. Therefore, the mask having the corresponding openings needs to be manufactured. The mask is manufactured by irradiating a laser beam to a predetermined area of, for example, a metal thin plate, in order to form the openings.

However, according to a laser processing apparatus of the prior art, a structure of the laser processing apparatus has to be changed whenever a shape of a processing target to be manufactured is changed.

SUMMARY

One or more embodiments include a laser processing method capable of performing various types of processing while reducing a need to change components, and method of manufacturing a display apparatus by using the laser processing method.

Additional aspects will be set forth in part in the description which follows and, in part, will be apparent from the description, or may be learned by practice of the presented embodiments.

According to one or more embodiments, a laser processing method includes: splitting a laser beam emitted from a laser beam source into a plurality of laser beams by using a laser beam splitter; and transmitting at least two of the plurality of laser beams through a position adjustment equipment that is on paths of the at least two laser beams in order to adjust a distance between the at least two laser beams by using a difference between a refractive index of an element of the position adjustment equipment and a refractive index of a peripheral environment.

The adjusting of the distance may include transmitting the at least two laser beams through a flexible transmission plate included in the position adjustment unit.

The laser processing method may further include adjusting degree of bending of the flexible transmission plate.

The adjusting degree of bending of the flexible transmission plate may be performed by adjusting positions of a plurality of adjustment pins included in the position adjustment unit.

The laser processing method may further include adjusting local curvatures of the flexible transmission plate at a plurality of locations.

The adjusting local curvatures of the flexible transmission plate at a plurality of locations may be performed by adjusting positions of a plurality of adjustment pins included in the position adjustment unit.

The adjusting of the distance may include transmitting the at least two laser beams through the position adjustment equipment in parallel with each other.

The adjusting of the distance may include transmitting all of the plurality of laser beams through the position adjustment unit.

The laser processing method may further include irradiating the laser beams having an adjusted distance therebetween onto a processing target.

The laser processing method may further include forming a plurality of openings at a same time by irradiating the laser beams having an adjusted distance therebetween onto a sheet.

According to one or more embodiments, a method of manufacturing a display apparatus, the method includes: splitting a laser beam emitted from a laser beam source into a plurality of laser beams by using a laser beam splitter; transmitting at least two of the plurality of laser beams through a position adjustment equipment that is on paths of the at least two laser beams in order to adjust a distance between the at least two laser beams by using a difference between a refractive index of the position adjustment equipment and a refractive index of a peripheral environment; forming a plurality of openings at the same time by irradiating the laser beams having an adjusted distance therebetween onto a sheet; and forming a patterned layer on a substrate by passing an evaporation material though the plurality of openings of the sheet.

The adjusting of the distance may include transmitting the at least two laser beams through a flexible transmission plate included in the position adjustment unit.

The method may further include adjusting degree of bending of the flexible transmission plate.

The method may further include adjusting local curvatures of the flexible transmission plate at a plurality of locations.

The adjusting of the distance may include transmitting the at least two laser beams through the position adjustment equipment in parallel with each other.

The adjusting of the distance may include transmitting all of the plurality of laser beams through the position adjustment unit.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
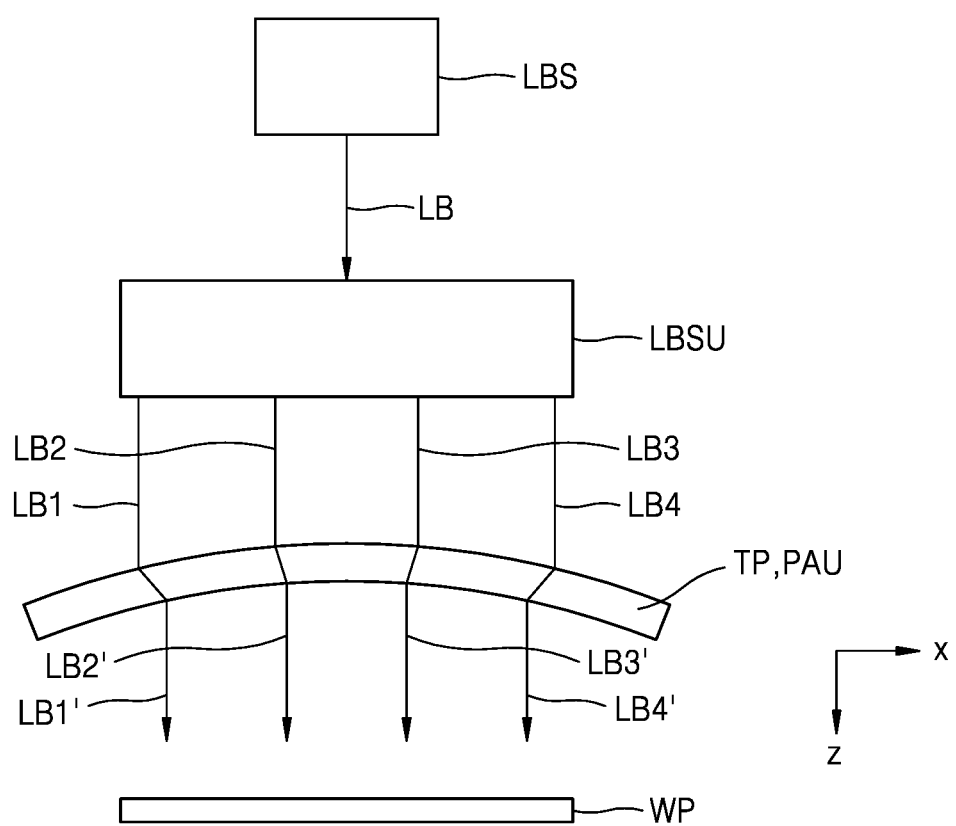
FIG. 1 is a conceptual diagram schematically illustrating a laser processing apparatus according to an embodiment and a processing target.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the present disclosure will be described in detail by explaining preferred embodiments of the inventive concept with reference to the attached drawings. Like reference numerals in the drawings denote like elements.

Sizes of components in the drawings may be exaggerated for convenience of explanation. In other words, since sizes and thicknesses of components in the drawings are arbitrarily illustrated for convenience of explanation, the following embodiments are not limited thereto.

In the following examples, an x-axis, a y-axis and a z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

FIG. 1 is a schematic conceptual diagram of a laser processing apparatus according to an embodiment and a processing target. As shown in FIG. 1, the laser processing apparatus according to the embodiment includes a laser beam source (LBS), a laser beam splitter (LBSU), and a position adjustment equipment (PAU).

The laser beam source LBS may emit a laser beam. As will be described later, since a processing target is processed by the laser beam emitted from the laser beam source LBS, the laser beam emitted from the laser beam source LBS needs to have a sufficient intensity to process the processing target. The laser beam splitter LBSU is located on a path of a laser beam LB emitted from the laser beam source LBS. Accordingly, the laser beam splitter LBSU splits the laser beam LB into a plurality of laser beams LB1, LB2, LB3, and LB4. The laser beam splitter LBSU may include a diffractive optical element lens.

The position adjustment equipment PAU is located on paths of at least two laser beams from among the plurality of laser beams LB1, LB2, LB3, and LB4 behind the laser beam splitter LBSU. In FIG. 1, a transmission plate TP included in the position adjustment equipment PAU is located on paths of all of the plurality of laser beams LB1, LB2, LB3, and LB4. That is, all of the plurality of laser beams LB1, LB2, LB3, and LB4 pass through the transmission plate TP of the position adjustment equipment PAU in FIG. 1. Laser beams LB1', LB2', LB3', and LB4' that have passed through the position adjustment equipment PAU reach a processing target WP.

The position adjustment equipment PAU may adjust a distance between at least two laser beams passing therethrough, by using a difference between a refractive index of at least one element thereof and a refractive index of a peripheral environment. Hereinafter, this will be described in detail.

Figure 2:
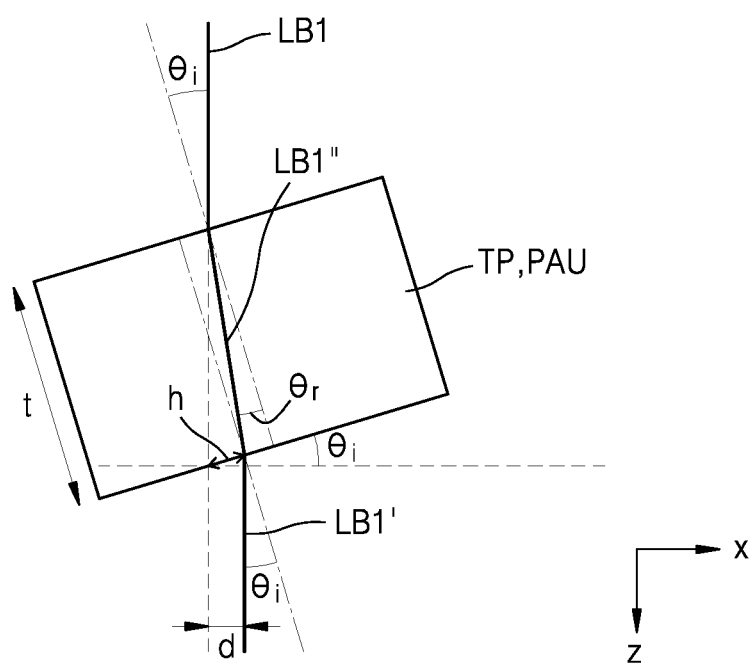
FIG. 2 is a conceptual diagram schematically showing a change in a path of a laser beam in a part of the laser processing apparatus of FIG. 1.

FIG. 2 is a schematic conceptual diagram showing a variation in a path of a laser beam in the transmission plate TP of the laser processing apparatus of FIG. 1. As shown in FIG. 2, the laser beam LB1 proceeding in a +z direction changes the path thereof while passing through the transmission plate TP due to a difference between the refractive indexes of the transmission plate TP and the peripheral environment. Accordingly, as shown in FIG. 2, although the laser beam LB', after passing through the transmission plate TP, proceeds in the +z direction like the laser beam LB1 before passing through the transmission plate TP, a position of the laser beam LB1' on an xy-plane after passing through the transmission plate TP is different from that of the laser beam LB1 on the xy-plane before passing through the transmission plate TP.

When it is assumed that a refractive index of the transmission plate TP is $n_2$, a refractive index of the peripheral environment is $n_1$, an incident angle of the laser beam LB1 to the transmission plate TP is $\theta_i$, and a refractive angle of a laser beam LB1" within the transmission plate is $\theta_r$, relations among them may be expressed by the following Equation 1 according to Snell's law.

$$n_1 \sin \theta_i = n_2 \sin \theta_r \quad \text{(Equation 1)}$$

In addition, a distance h on a surface of the transmission plate TP between an extension (dashed-dot line of FIG. 2) of the path of the laser beam LB1 before passing through the transmission plate TP having a thickness t and the path of the laser beam LB1' after passing through the transmission plate TP may be expressed by the following Equation 2.

$$h = t(\tan \theta_i - \tan \theta_r) \quad \text{(Equation 2)}$$

By using the above Equations 1 and 2, a distance d between an extension (dashed-dot line of FIG. 2) of the path of the laser beam LB1 before passing through the transmission plate TP and the path of the laser beam LB1' after passing through the transmission plate TP may be expressed by the following Equation 3.

$$d = h \times \cos \theta_i = t(\sin \theta_i - \sin \theta_r \cos \theta_i / \cos \theta_r) = t(\sin \theta_i - n_1 \sin \theta_i \cos \theta_i / n_2 \cos \theta_r) \quad \text{(Equation 3)}$$

Here, when values of $\theta_i$ and $\theta_r$ are sufficiently small, the above Equation 3 may be approximated as the following Equation 4.

$$d = t(\theta_i - n_1 \theta_i / n_2) = t\theta_i(n_2 - n_1)/n_2 \quad \text{(Equation 4)}$$

As described above, a position correction distance d between the laser beam LB1 before passing through the transmission plate TP and the laser beam LB1' after passing through the transmission plate TP may be defined by using the thickness t of the transmission plate TP, the refractive index $n_2$ of the transmission plate TP, the refractive index $n_1$ of the peripheral environment, and the incident angle $\theta_i$ of the laser beam LB1 to the transmission plate TP. Here, since the values of t, $n_1$, and $n_2$ are fixed, the position correction distance d may be interpreted as a function of $\theta_i$, that is, an inclination degree of the transmission plate TP. That is, the difference between the laser beam LB1 before passing through the transmission plate TP and the laser beam LB1' after passing through the transmission plate TP on the xy-plane may be adjusted according to the inclination degree of the transmission plate TP.

Figure 3:
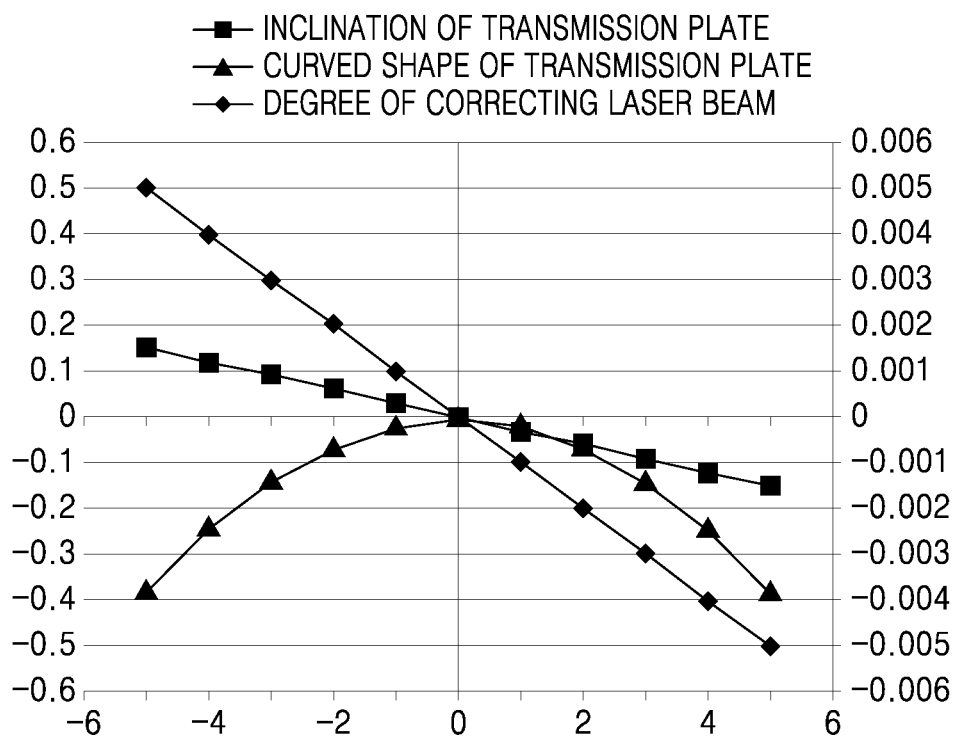
FIG. 3 is a graph schematically illustrating a compensation degree of a laser beam by the laser processing apparatus of FIG. 1.

FIG. 3 is a graph schematically showing a degree of correcting the laser beam by the laser processing apparatus of FIG. 1. As shown in FIG. 3, if the transmission plate TP is curved, the inclination of the transmission plate TP, that is, the incident angle of the laser beam LB1, varies depending on each point of the transmission plate TP, and accordingly, a degree of correcting the laser beam varies. In the graph of FIG. 3, a longitudinal axis at the left side denotes an inclination angle of the laser beam LB1 to each point on the transmission plate TP having a refractive index of 1.5 and a thickness of 0.1 mm, and a longitudinal axis at the right side denotes a position variation amount (unit: mm) between the laser beam LB1 and the laser beam LB1' as the laser beam LB1 passes through each point of the transmission plate TP. In FIG. 3, numbers of a transverse axis are understood to represent locations where the laser beams are incident in the transmission plate TP.

According to the laser processing apparatus of the embodiment, the distance between the laser beams may be adjusted simply by adjusting the position adjustment unit, without manipulating the laser beam source LBS, the laser beam splitter LBSU, or the other optical elements. Accordingly, even if a shape of the processing target or processing conditions are changed, laser processing may be implemented simply in correspondence with the changes.

For example, when a mask having openings at preset locations is manufactured, the openings are formed by irradiating a laser beam to the preset locations in a metal thin plate. Here, if a size or a resolution of a display apparatus that is to be manufactured changes, locations of the openings formed during manufacturing of the mask are changed as well. In this circumstance, the laser processing apparatus according to the prior art has to adjust locations of the laser beams by correcting the laser beam splitter having a complicated structure. However, according to the laser processing apparatus of the embodiment, the distance between the laser beams may be adjusted only by adjusting the position adjustment equipment, and in particular, by adjusting a degree of bending or local curvatures of the transmission plate TP by adjusting the position adjustment equipment PAU. Therefore, masks having different structures from each other may be easily manufactured. Here, the local curvatures denote a plurality of curvatures of the transmission plate TP at a plurality of locations. The plurality of curvatures of the transmission plate TP at a plurality of locations may be adjusted by adjusting positions of the plurality of adjustment pins P1 through P4 included in the position adjustment equipment PAU.

According to the laser processing apparatus of the embodiment, even when abnormal situation occurs in the laser beam splitter LBSU or other optical elements and an error occurs in the location of at least one of the laser beams LB1, LB2, LB3, and LB4, there is no need to replace or repair the laser beam splitter LBSU or the optical elements that are complicated and relatively expensive. That is, the location of the laser beam having an error from among the laser beams LB1, LB2, LB3, and LB4 may be effectively corrected by adjusting the degree of incline or angle of curvature of the transmission plate TP of the position adjustment equipment PAU in the laser processing apparatus of the present embodiment.

Figure 4:
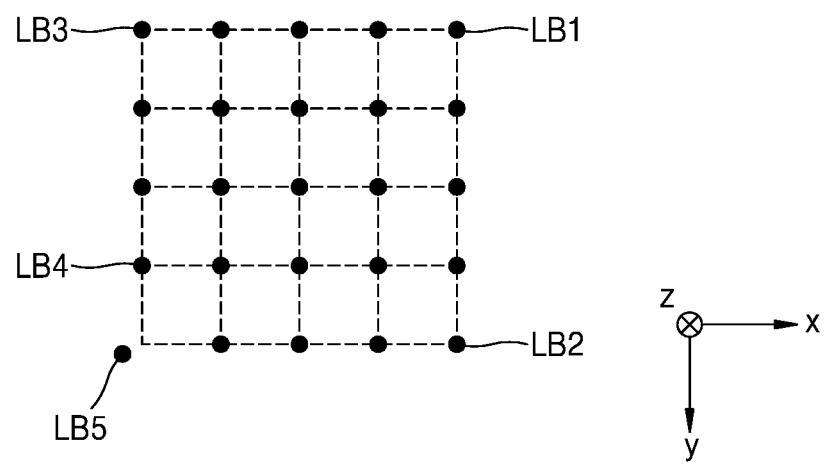
FIG. 4 is a schematic conceptual diagram of laser beams having distortion in some paths.
Figure 5:
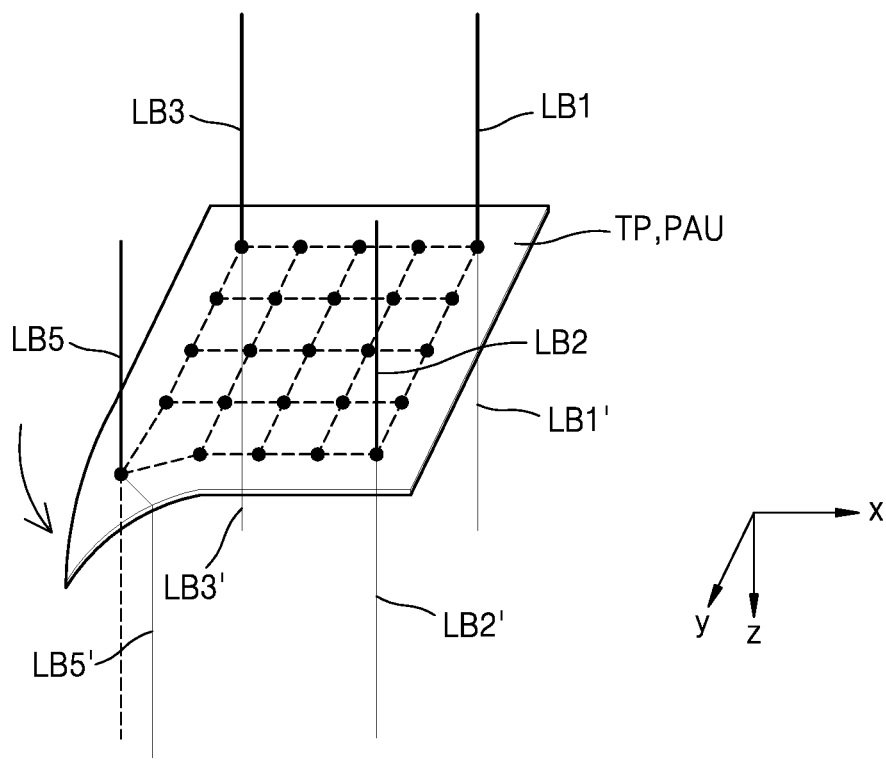
FIG. 5 is a schematic conceptual diagram illustrating compensation for the distortion of FIG. 4.
Figure 6:
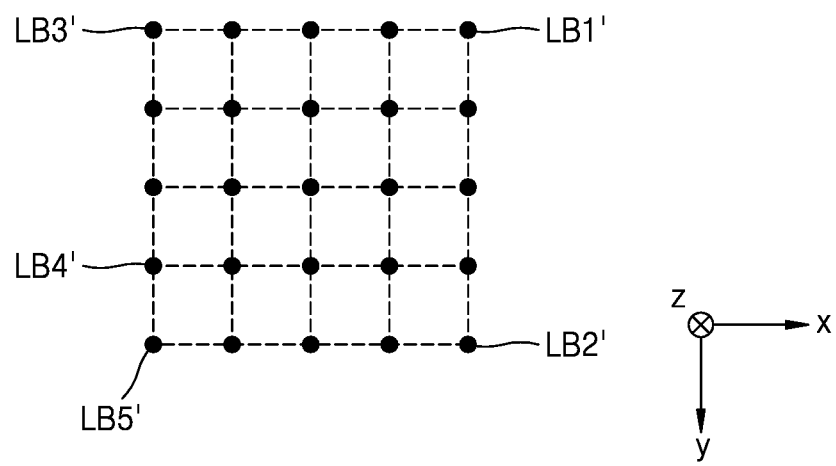
FIG. 6 is a schematic conceptual diagram of laser beams, distortion of which is compensated for in FIG. 5.

FIG. 4 is a schematic conceptual diagram of laser beams LB1, LB2, LB3, LB4, and LB5 having distortions in some paths thereof. Although the paths of the laser beams LB1, LB2, LB3, LB4, and LB5 need to be constant, the laser beam LB5 may be mis-aligned in a −x direction and a +y direction as shown in FIG. 4, and then, the position of the laser beam LB5 may be corrected by using the transmission plate TP of the position adjustment equipment PAU as shown in FIG. 5. That is, the laser beams LB1, LB2, LB3, and LB4, whose positions are correct, are incident nearly perpendicularly to the transmission plate TP, and only a part of the transmission plate TP, through which the laser beam LB5 having the wrong position passes, is curved. Thus, even if the position of the laser beam LB5 is wrong, a position of a laser beam LB5', after passing through the transmission plate TP, may be corrected as shown in FIG. 6.

Figure 7:
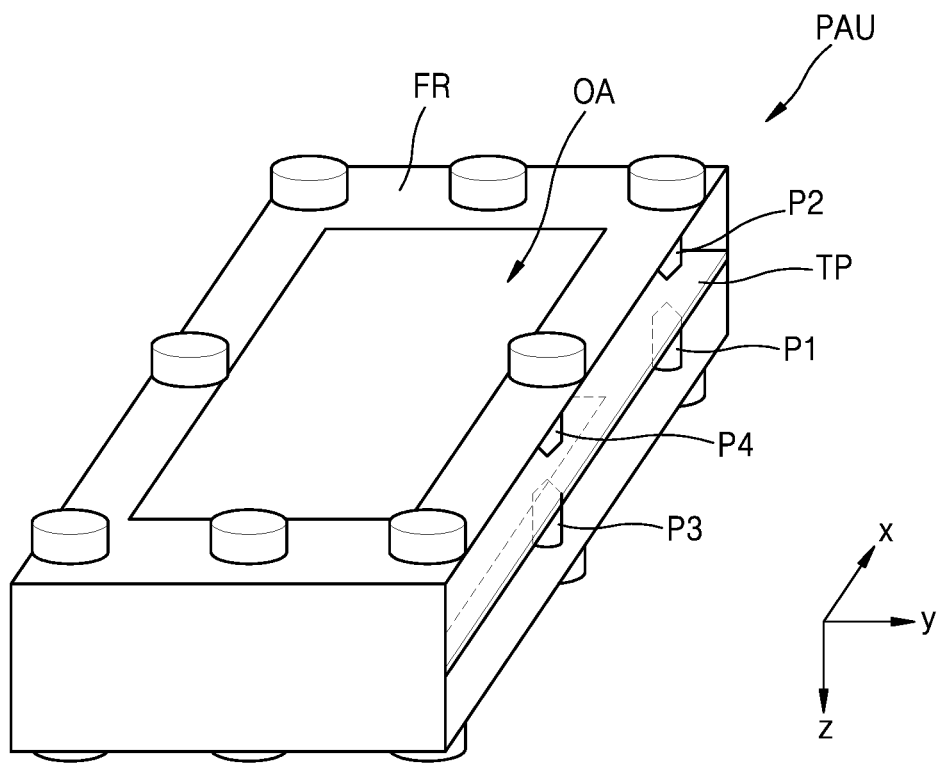
FIG. 7 and FIG. 8 are respectively a perspective view and a side view of a position adjustment equipment in a laser processing apparatus according to an embodiment.
Figure 8:
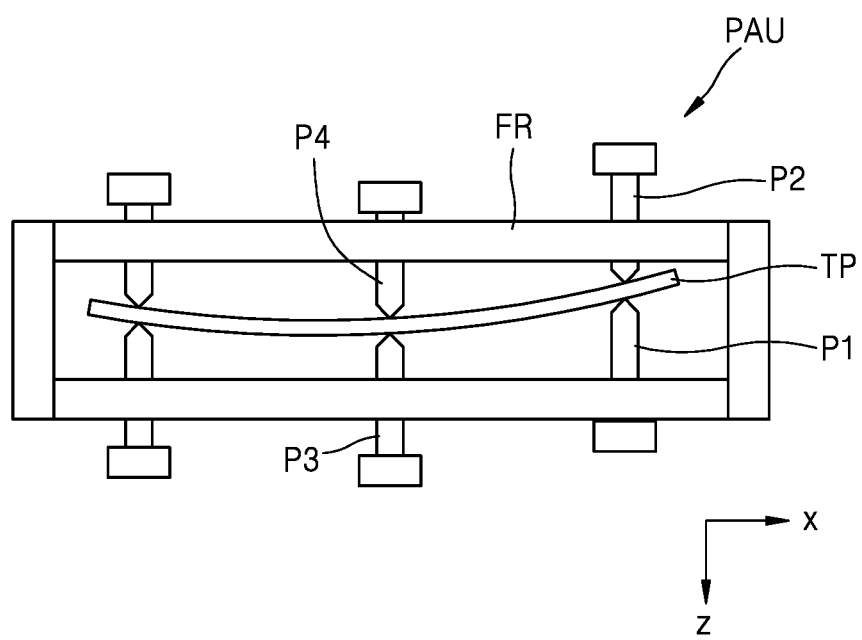

The position adjustment equipment PAU may have various structures, such as the structures shown in FIG. 7, which is a perspective view, and in FIG. 8, which is a side view. Referring to FIGS. 7 and 8, the position adjustment equipment PAU may include a frame FR, the transmission plate TP, and a plurality of adjustment pins P1, P2, P3, and P4.

The frame FR may have various shapes. For example, the frame FR may have a space in which the transmission plate TP is to be located therein as shown in FIGS. 7 and 8. In addition, as shown in FIG. 7, the frame FR may have an opening area OA so that the laser beams may be incident to the transmission plate TP. In addition, the frame FR includes a plurality of through holes, through which the adjustment pins P1, P2, P3, and P4 may be inserted. The through holes may have screw threads in an internal surface thereof, so that the adjustment pins P1, P2, P3, and P4 may be screwed to the frame FR. Degrees of inserting the adjustment pins P1, P2, P3, and P4 in the frame FR may be adjusted.

In the position adjustment equipment PAU as above, positions of at least two adjustment pins from among the plurality of adjustment pins P1, P2, P3, and P4 are differently adjusted from the others, and thus, a curved angle of the transmission plate TP may be simply and exactly adjusted. As shown in the side view of FIG. 8, end portions of the adjustment pins P1 and P2 that are located above and below the transmission plate TP, respectively, contact the transmission plate TP in a first point of the transmission plate TP, and end portions of the adjustment pins P3 and P4 that are located above and below the transmission plate TP contact the transmission plate TP tin a second point to be different from the first point so as to adjust the curved angle of the transmission plate TP. In particular, a portion to be curved in the transmission plate TP and the curved angle of the transmission plate TP may be easily adjusted by adjusting the insertion degrees of the adjustment pins P1, P2, P3, and P4 in the frame FR. In order to use the transmission plate TP while continuously being transformed, the transmission plate TP may be flexible.

Figure 9:
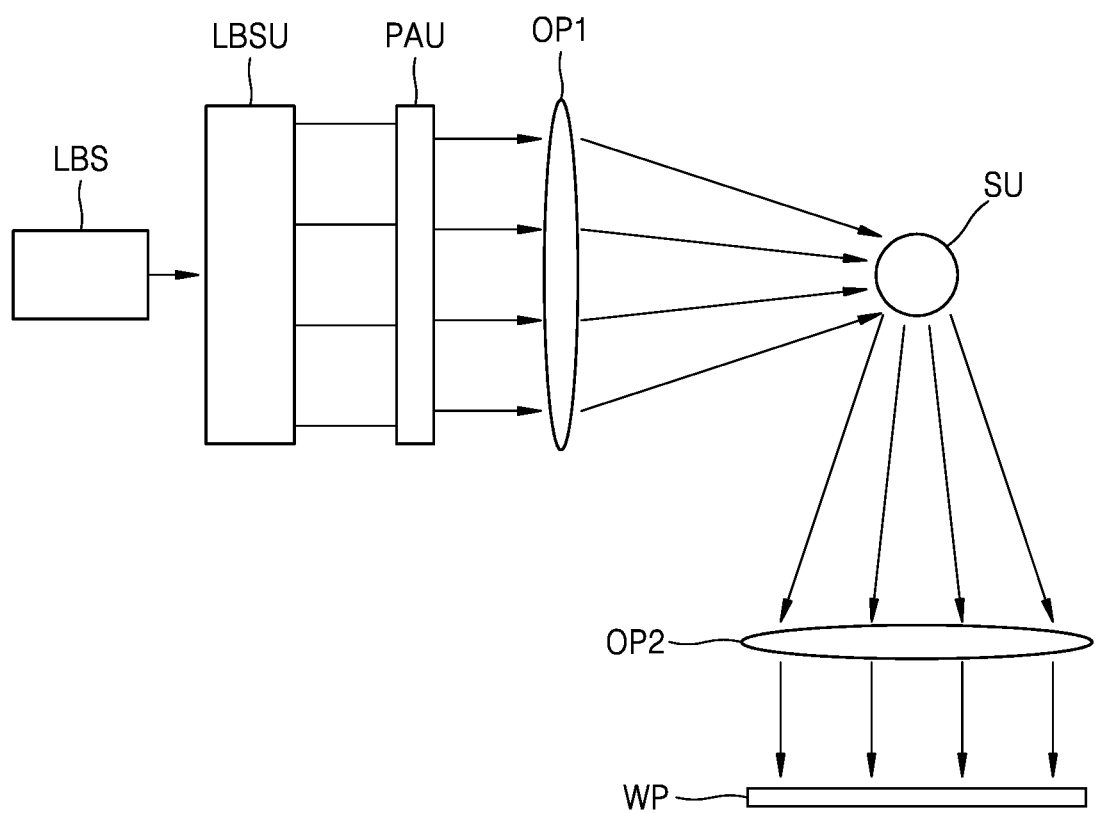
FIG. 9 is a schematic conceptual diagram of a laser processing apparatus according to an embodiment and a processing target.
Figure 10:
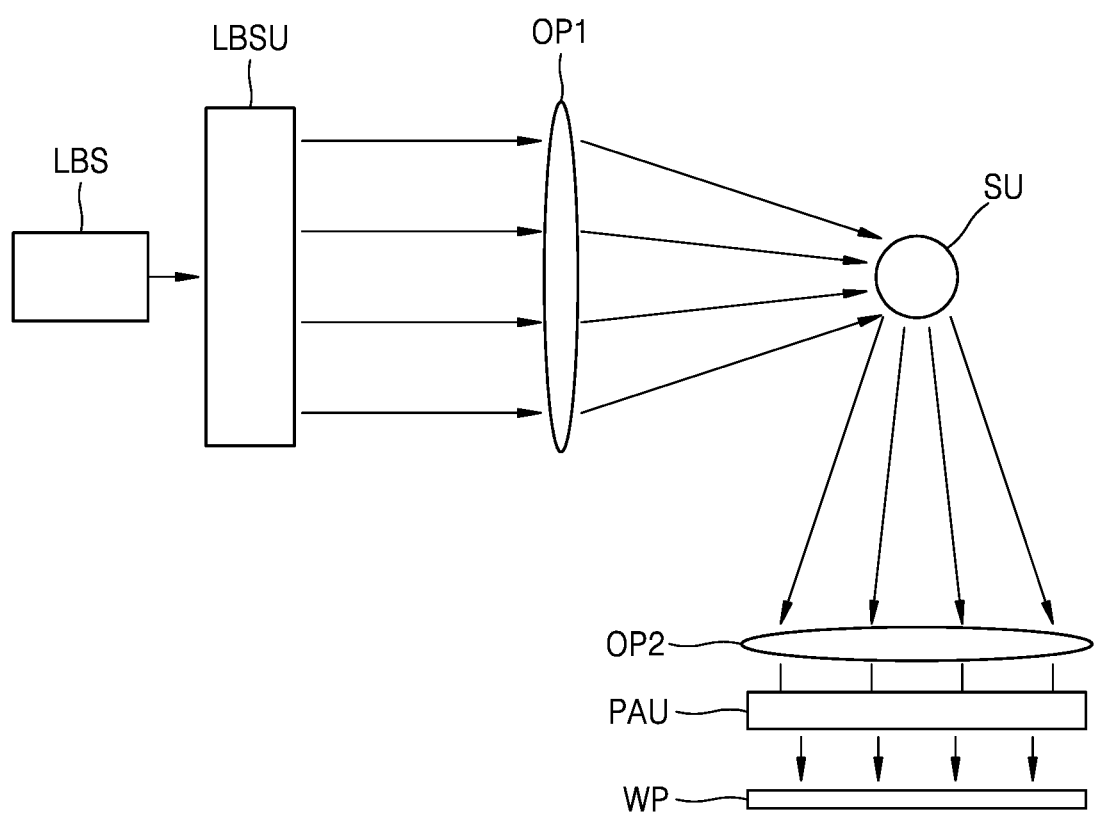
FIG. 10 is a schematic conceptual diagram of a laser processing apparatus according to an embodiment and a processing target.

The position adjustment equipment PAU may be located at various locations in the laser processing apparatus, provided that the various locations are behind the laser beam splitter LBSU. In particular, the position adjustment equipment PAU may be located so that at least two laser beams transmitting through the position adjustment equipment PAU may be incident thereto in parallel with each other. In FIG. 9, a plurality of laser beams split by the laser beam splitter LBSU in parallel with each other are incident to the position adjustment equipment PAU, and after that, the plurality of laser beams are irradiated to the processing target WP via a first optical element OP1, a scanning unit SU, and a second optical element OP2. The scanning unit SU may include, for example, a reflection plate, and change a proceeding direction of the laser beams. As shown in FIG. 10, the position adjustment equipment PAU may be located so that the laser beams split by the laser beam splitter LBSU may be incident to the position adjustment equipment PAU when the laser beams are in parallel with one another after passing through the first optical element OP1, the scanning unit SU, and the second optical element OP2, and before being irradiated to the processing target WP. As described above, when the laser beams are incident to the position adjustment equipment PAU in a state where the laser beams are in parallel with each other, it may be easily determined which part of the transmission plate TP of the position adjustment equipment PAU and how much adjustment are needed.

So far, the laser processing apparatus is described as above, but one or more embodiments are not limited thereto. For example, a laser processing method using the laser processing apparatus may be included in a scope of the inventive concept.

According to the laser processing method of an embodiment, the laser beam LB emitted from the laser beam source LBS is split into the plurality of laser beams LB1, LB2, LB3, and LB4 by the laser beam splitter LBSU, as shown in FIG. 1. In addition, the position adjustment equipment PAU is located on the path of at least two of the plurality of laser beams LB1, LB2, LB3, and LB4, so that the at least two laser beams pass through the position adjustment equipment PAU and distances between the laser beams LB1', LB2', LB3', and LB4' that passed through the transmission plate TP in the position adjustment equipment PAU may be modified by using the difference between the refractive indexes. Adjusting of the distance may be a process in which the at least two laser beams pass through the transmission plate TP that is flexible in the position adjustment equipment PAU. After that, a process of irradiating the laser beams LB1', LB2', LB3', and LB4', distances of which are adjusted, onto the processing target WP.

According to the laser processing method of the embodiment, a distance difference on the xy-plane between the laser beam LB1 before passing through the transmission plate TP and the laser beam LB1' after passing through the transmission plate TP may be adjusted as shown in FIG. 2 only by adjusting the transmission plate TP. For example, as shown in FIGS. 7 and 8, the positions of the plurality of adjustment pins P1, P2, P3, and P4 included in the position adjustment equipment PAU are adjusted to adjust the curved angle of the transmission plate TP, and then, a correction degree of the distances among the laser beams LB1', LB2', LB3', and LB4' passed through the transmission plate TP may be determined.

Here, the adjusting of distances among the laser beams may be a process of transmitting at least two laser beams through the position adjustment equipment PAU in parallel with each other. For example, as shown in FIG. 9, the plurality of laser beams that are split by the laser beam splitter LBSU in parallel with each other are incident to the position adjustment equipment PAU, and after that, are irradiated to the processing target WP via the first optical element OP1, the scanning unit SU, and the second optical element OP2. Otherwise, as shown in FIG. 10, the laser beams split by the laser beam splitter LBSU may be incident to the position adjustment equipment PAU before being irradiated onto the processing target WP when they are in parallel with each other after passing through the first optical element OP1, the scanning unit SU, and the second optical element OP2. As described above, when the laser beams are incident to the position adjustment equipment PAU in parallel with each other, a position of the transmission plate TP in the position adjustment equipment PAU, an amount and a direction of adjustment are easily determined.

In addition, the adjusting of the distance may be a process of transmitting the plurality of laser beams through the position adjustment unit. In this case, a laser beam that does not need to be adjusted may be nearly perpendicularly incident to the transmission plate TP to maintain the original path, and a laser beam that needs to be adjusted is incident to the transmission plate TP to be inclined so as to correct the path.

According to the laser processing method, a process of irradiating the laser beams having adjusted distances onto a metal sheet so as to form a plurality of openings at the same time may be performed to manufacture a deposition metal mask.

According to one or more embodiments, the laser processing method and apparatus capable of performing the processing in various types while reducing change in the components may be implemented. However, a scope of the one or more embodiments is not limited thereto.

So far, the laser processing method is described as above, but one or more embodiments are not limited thereto. For example, method of manufacturing a display apparatus using the laser processing method may be included in a scope of the present disclosure. For example, a mask having a plurality of openings is necessary to manufacture a display apparatus. Such mask may be used to form a patterned layer on a substrate by passing an evaporation material through the plurality of openings of the mask. Thus, in manufacturing a display apparatus, a mask produced by using the laser processing method can be used.

In that case, the method of manufacturing a display apparatus may include: splitting a laser beam emitted from a laser beam source into a plurality of laser beams by using a laser beam splitter; transmitting at least two of the plurality of laser beams through a position adjustment equipment that is on paths of the at least two laser beams in order to adjust a distance between the at least two laser beams by using a difference between a refractive index of the position adjustment equipment and a refractive index of a peripheral environment; forming a plurality of openings at a same time by irradiating the laser beams having an adjusted distance therebetween onto a sheet; and forming a patterned layer on a substrate by passing an evaporation material though the plurality of openings of the sheet. Here, the sheet may be a part of the mask.

Here, the adjusting of the distance may include transmitting the at least two laser beams through a flexible transmission plate included in the position adjustment equipment. Further, it may be possible to adjust degree of bending of the transmission plate by adjusting positions of a plurality of adjustment pins included in the position adjustment equipment in order to adjust the distance between the at least two laser beams. Or, it may be possible to adjust local curvatures of the transmission plate at a plurality of locations by adjusting positions of a plurality of adjustment pins included in the position adjustment equipment in order to adjust the distance between the at least two laser beams.

In this process, the adjusting of the distance may include transmitting the at least two laser beams through the position adjustment equipment in parallel with each other, or transmitting all of the plurality of laser beams through the position adjustment unit.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A laser processing method comprising:
splitting a laser beam emitted from a laser beam source into a plurality of laser beams using a laser beam splitter;
transmitting at least two laser beams of the plurality of laser beams through a refractor that is on paths of the at least two laser beams in order to adjust a distance between the at least two laser beams by bending at least a portion of a first flat surface of an element of the refractor into a first curved surface when bending at least a portion of a second flat surface of the element of the refractor into a second curved surface and by arranging at least one laser beam of the at least two laser beams to enter the element of the refractor through the first curved surface and subsequently exit the element of the refractor through the second curved surface, wherein the adjusting of the distance comprises transmitting the at least two laser beams through a flexible transmission plate included in the refractor;
adjusting degree of bending of the flexible transmission plate by adjusting positions of adjustment pins that directly contact the flexible transmission plate, wherein the second flat surface of the element of the refractor is a flat surface of the flexible transmission plate; and
keeping both another portion of the first flat surface and another portion of the second flat surface flat when bending both the portion of the first flat surface and the portion of the second flat surface.

2. The laser processing method of claim 1, further comprising adjusting local curvatures of the flexible transmission plate at a plurality of locations.

3. The laser processing method of claim 2, the adjusting local curvatures of the flexible transmission plate at a plurality of locations is performed by adjusting positions of a plurality of adjustment pins that are arranged adjacent to the flexible transmission plate.

4. The laser processing method of claim 1, wherein the adjusting of the distance comprises transmitting the at least two laser beams through the refractor in parallel with each other.

5. The laser processing method of claim 1, wherein the adjusting of the distance comprises transmitting all of the plurality of laser beams through the refractor.

6. The laser processing method of claim 1, further comprising irradiating the laser beams having an adjusted distance therebetween onto a processing target.

7. The laser processing method of claim 1, further comprising forming a plurality of openings at a same time by irradiating the laser beams having an adjusted distance therebetween onto a sheet.

8. A method of manufacturing a display apparatus, the method comprising:
splitting a laser beam emitted from a laser beam source into a plurality of laser beams using a laser beam splitter;
transmitting at least two laser beams of the plurality of laser beams through a refractor that is on paths of the at least two laser beams in order to adjust a distance between the at least two laser beams by bending at least a portion of a first flat surface of an element of the refractor into a first curved surface when bending at least a portion of a second flat surface of the element of the refractor into a second curved surface and by arranging at least one laser beam of the at least two laser beams to enter the element of the refractor through the first curved surface and subsequently exit the element of the refractor through the second curved surface, wherein the adjusting of the distance comprises transmitting the at least two laser beams through a flexible transmission plate included in the refractor;
adjusting degree of bending of the flexible transmission plate by adjusting positions of a plurality of adjustment pins, and wherein the flexible transmission plate is positioned between two of the adjustment pins in a direction perpendicular to the flat surface of the flexible transmission plate, wherein the flat surface of the element of the refractor is a flat surface of the flexible transmission plate;
keeping both another portion of the first flat surface and another portion of the second flat surface flat when bending both the portion of the first flat surface and the portion of the second flat surface;
forming a plurality of openings at the same time by irradiating the laser beams having an adjusted distance therebetween onto a sheet; and
forming a patterned layer on a substrate by passing an evaporation material through the plurality of openings of the sheet.

9. The method of claim 8, further comprising adjusting local curvatures of the flexible transmission plate at a plurality of locations.

10. The method of claim 9, wherein the adjusting local curvatures of the flexible transmission plate at a plurality of locations is performed by adjusting positions of adjustment pins that are arranged in at least two parallel rows each including at least two adjustment pins.

11. The method of claim 8, wherein the adjusting of the distance comprises transmitting the at least two laser beams through the refractor in parallel with each other.

12. The method of claim 8, wherein the adjusting of the distance comprises transmitting all of the plurality of laser beams through the refractor.

* * * * *